(No Model.)

T. WARWICK.
BICYCLE SADDLE.

No. 316,702.  Patented Apr. 28, 1885.

WITNESSES:

INVENTOR
Thomas Warwick
BY R. F. Hyde
ATTORNEY

UNITED STATES PATENT OFFICE.

THOMAS WARWICK, OF ASTON JUXTA, BIRMINGHAM, COUNTY OF WARWICK, ENGLAND.

BICYCLE-SADDLE.

SPECIFICATION forming part of Letters Patent No. 316,702, dated April 28, 1885.

Application filed August 4, 1884. (No model.) Patented in England May 14, 1884, No. 7,698.

*To all whom it may concern:*

Be it known that I, THOMAS WARWICK, a subject of the Queen of Great Britain, residing at Aston Juxta, Birmingham, in the county of Warwick, England, have invented new and useful Improvements in Saddles for Bicycles, Tricycles, and other Vehicles, (for which I have obtained a patent in Great Britain dated May 14, 1884, No. 7,698,) of which the following is a specification.

This invention relates to improvements in the construction of spring-seats for bicycles and other similar vehicles, the object being to improve the means for making such seats or saddles act automatically to keep the covering thereof stretched to a suitable tension and thereby to maintain the seat in an easy position for the rider.

Figure 1:
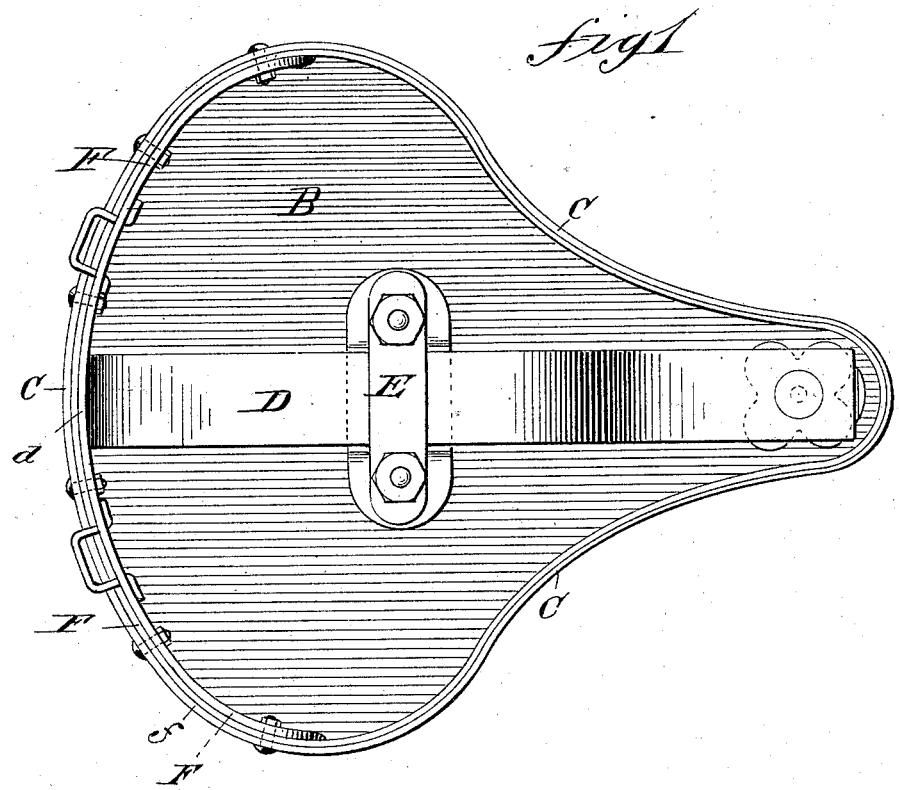
Figure 2:
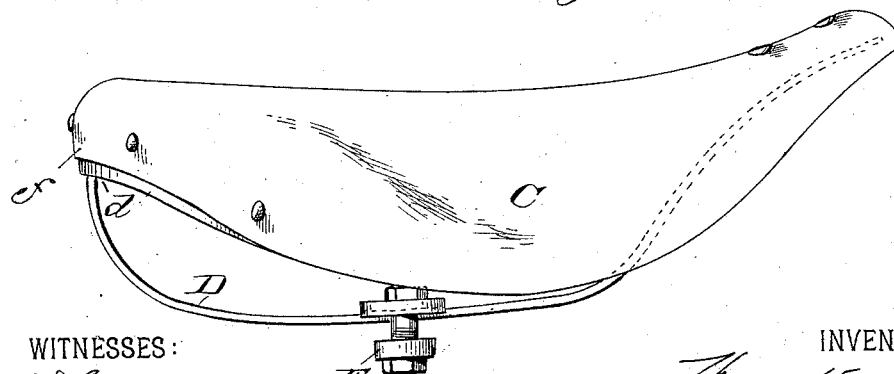

This invention is fully illustrated in the accompanying drawings, in which Figure 1 is a plan view of my improved saddle inverted, and Fig. 2 a longitudinal side elevation.

B is the seat-surface, formed of any suitable material—such as leather—adapted to be blocked to have the flaps and rim for the frame formed therefrom. The flaps C, blocked from the seat or cover B, present the usual contour, as seen in Fig. 1, of a "suspended saddle," and are continued around the pommel and cantle, as shown, to form a bearing-rim at the cantle for the supporting-frame, and around the pommel to afford a rounded easy surface at that point of the seat.

D is a spring having the seat secured to it at the pommel, and curved from the seat and below it, to be joined to the seat again at the cantle.

E is the point and means of attachment of the saddle to its vehicle.

F is a rim or band, preferably of metal, and adapted to conform to and fit within the inverted rim $f$, formed upon the edge of the cantle from the cover B. The ends of band F extend, as shown in Fig. 1, to points opposite the longer transverse diameter of the seat, while in the center of the band, at $d$, the spring D has its end secured thereto, the rim F being bolted or otherwise secured upon the inner surface of the rim $f$, to extend the entire circumference of the cantle. The spring D, having one end fast to the frame and its otherwise free end secured to rim F at $d$, exerts a constant pressure to distend the cover B in a longitudinal direction. To provide also a constant tension upon the seat-cover B transversely, I form the part F of a spring having a normal shape, as indicated in dotted lines, Fig. 1, and compressed to take its position within the inverted rim $f$ of the seat, as seen in the drawings, so that the opposite ends act approximately at right angles to the line of action of spring D. The result of the combined action of the two springs, or one compound spring, is to keep the seat-cover B in a state of tension throughout all of its surface, and a suspended saddle is formed, in which all looseness, slack, or buckling of the cover from atmospheric or other causes is prevented.

In the saddles in common use having supporting frames or plates extending around the entire saddle the edges of the frame are felt uncomfortably through the seat-cover upon the slightest looseness resulting therein, and in those saddles having screws and other devices for manually taking up the slack in the cover much time is lost in making such adjustment, whereas in this improved saddle a soft elastic seat is maintained, always removed from contact with any frame or plate below.

Now, having described my invention, what I claim is—

In saddles for bicycles, tricycles, and other vehicles, a cover, B, a spring, D, bowed beneath the cover to have one end secured to the pommel and its other beneath the cantle, and a spring-band, F, compressed and secured beneath the cantle to have its ends extend to the widest part thereof and secured to one end of spring D, so as to compress it between its ends, all combined and operating to form a saddle having its seat-surface automatically stretched by its supporting-frame.

THOMAS WARWICK.

Witnesses:
T. EMERY DAVIES,
*Solicitor, Birmingham, England.*
CHARLES JOHNSTONE,
*Clerk to the above-named T. Emery Davies.*